(12) United States Patent
Moss et al.

(10) Patent No.: US 12,541,362 B2
(45) Date of Patent: Feb. 3, 2026

(54) SYSTEM AND METHOD OF USING ADVANCED COMPUTATION MODELS FOR DATA ANALYSIS AND AUTOMATED DECISION-MAKING FOR CODE CHANGE SCHEDULING CONFLICTS

(71) Applicant: BANK OF AMERICA CORPORATION, Charlotte, NC (US)

(72) Inventors: Susan Moss, Vestal, NY (US); Kiran Boosetty, Saint Johns, FL (US); Richard Michael Foster, Elkton, MD (US); Richard J. Fulginiti, Jr., Marlton, NJ (US); Gerard P. Gay, Seattle, WA (US); Andrzej Grabski, Glen Rock, NJ (US); Malinda Mae Kieffer, Chillicothe, MO (US); Rahul Kumar Mishra, Skillman, NJ (US); Samuel M. Moiyallah, Jr., Newark, DE (US); Donna Lee Phillips, Elkton, MD (US); Robert Ronald Rosseland, Jr., Huntersville, NC (US); Ravinder Kaur Sodhi, Royse City, TX (US); Tanya A. Wilson, Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 224 days.

(21) Appl. No.: 18/237,199

(22) Filed: Aug. 23, 2023

(65) Prior Publication Data
US 2025/0068415 A1   Feb. 27, 2025

(51) Int. Cl.
*G06F 8/71*    (2018.01)

(52) U.S. Cl.
CPC .................................. *G06F 8/71* (2013.01)

(58) Field of Classification Search
CPC ....................................................... G06F 8/71
See application file for complete search history.

(56) References Cited

U.S. PATENT DOCUMENTS

| 6,256,773 B1* | 7/2001 | Bowman-Amuah | ..... G06F 8/71 707/999.203 |
| 7,546,595 B1* | 6/2009 | Wickham | .................. G06F 8/65 717/174 |

(Continued)

*Primary Examiner* — Douglas M Slachta
(74) *Attorney, Agent, or Firm* — Moore & Van Allen PLLC; Nicholas C. Russell (57) ABSTRACT

Systems, computer program products, and methods are described herein for advanced computation models for data analysis and automated decision-making for code change scheduling conflicts. The present disclosure is configured to receive a proposed code change associated with an electronic ecosystem from an end user; compile a set of planned code changes within a code change database; compare the proposed code change against the set of planned code changes; determine a set of affected operations by the proposed code change and the set of planned code changes within the electronic ecosystem using the advanced computation models for data analysis and automated decision-making; determine if a code change scheduling conflict exists between the proposed code change and the set of planned code; and transmit a notification to the end user upon determination of the code change scheduling conflict indicating the proposed code change conflicts with the set of planned code changes.

20 Claims, 5 Drawing Sheets

(56) References Cited

U.S. PATENT DOCUMENTS

| | | | |
|---|---|---|---|
| 7,584,467 B2 * | 9/2009 | Wickham | G06F 8/65 717/176 |
| 7,984,333 B2 * | 7/2011 | Ruan | H04L 41/0859 714/33 |
| 8,245,192 B1 * | 8/2012 | Chen | G06F 8/71 717/122 |
| 8,286,143 B2 | 10/2012 | Garimella | |
| 8,635,618 B2 * | 1/2014 | Aggarwal | G06F 9/4843 718/107 |
| 8,914,786 B2 * | 12/2014 | Cooley | G06F 8/60 717/176 |
| 8,984,485 B2 | 3/2015 | Elshishiny | |
| 10,635,566 B1 | 4/2020 | Talluri | |
| 11,150,893 B2 * | 10/2021 | Sabath | G06F 8/71 |
| 11,347,500 B2 * | 5/2022 | Krishnamoorthy | G06N 3/08 |
| 11,392,365 B2 * | 7/2022 | Tsfasman | G06F 8/65 |
| 11,531,536 B2 | 12/2022 | Goern | |
| 11,537,392 B2 * | 12/2022 | Kay | G06F 8/20 |
| 12,240,200 B2 * | 3/2025 | Nakai | B32B 7/12 |
| 2005/0204358 A1 * | 9/2005 | Hellerstein | G06F 8/60 718/104 |
| 2008/0184248 A1 * | 7/2008 | Barua | G06F 9/5027 718/104 |
| 2011/0214106 A1 | 9/2011 | Qi | |
| 2012/0110557 A1 | 5/2012 | Singh | |
| 2013/0179878 A1 * | 7/2013 | Dain | G06F 11/3423 717/177 |
| 2013/0346955 A1 * | 12/2013 | Cudak | G06F 8/70 717/168 |
| 2014/0059534 A1 * | 2/2014 | Daum | G06F 8/65 717/172 |
| 2014/0173564 A1 | 6/2014 | Crawford | |
| 2015/0220426 A1 | 8/2015 | Spektor | |
| 2018/0314519 A1 | 11/2018 | Lee | |
| 2019/0243617 A1 | 8/2019 | Stevens | |
| 2023/0315427 A1 * | 10/2023 | Onogi | G06F 8/65 |

* cited by examiner

SYSTEM AND METHOD OF USING ADVANCED COMPUTATION MODELS FOR DATA ANALYSIS AND AUTOMATED DECISION-MAKING FOR CODE CHANGE SCHEDULING CONFLICTS

TECHNOLOGICAL FIELD

Example embodiments of the present disclosure relate to systems and methods of using advanced computation models for data analysis and automated decision-making for code change scheduling conflicts.

BACKGROUND

Multiple scheduled technology changes (code changes) have been known to be scheduled in advance at similar times due to operational and schedule constraints. Code changes scheduled for similar times may cause incidents/issues from multiple code changes occurring simultaneously.

Applicant has identified a number of deficiencies and problems associated with using advanced computation models for data analysis and automated decision-making for code change scheduling conflicts. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for using advanced computational models for data analysis and automated decision-making for code change scheduling conflicts.

In one aspect, a system for using advanced computation models for data analysis and automated decision-making for code change scheduling conflicts is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: receive a proposed code change associated with an electronic ecosystem from an end user, wherein the proposed code change is comprised of: an identification of at least one element of the electronic ecosystem; and a range of time associated with the proposed code change; compile a set of planned code changes within a code change database, wherein a range of time associated with the set of planned code changes overlaps with the range of time associated with the proposed code change; compare the proposed code change against the set of planned code changes within the code change database; determine a set of affected operations by the proposed code change and the set of planned code changes within the electronic ecosystem using the advanced computation models for data analysis and automated decision-making; determine if a code change scheduling conflict exists between the proposed code change and the set of planned code changes within the code change database using the set of affected operations; and transmit a notification to the end user upon determination of the code change scheduling conflict indicating the proposed code change conflicts with the set of planned code changes within the code change database.

In some embodiments, the proposed code change is integrated into the code change database when there is no overlapping range of time between the proposed code change and the set of planned code changes within the code change database.

In some embodiments, wherein the set of affected operations comprises elements within the electronic ecosystem altered from the implementation of the proposed code change and the set of planned code changes.

In some embodiments, the proposed code change is further comprised of a set of modifications proposed to be performed on the at least one element identified within the electronic ecosystem.

In some embodiments, determination of the existence of the code change scheduling conflict between the proposed code change and the set of planned code changes within the code change data base further comprises: assignment of priority to the set of planned code changes within the code change database; arrangement of the set of planned code changes within the code change database based on the assigned priority; and adjustment of the set of planned code changes within the code change database.

In some embodiments, transmission of the notification to the end user comprises a notification of the set of affected operations and the set of collision changes within the electronic ecosystem by the proposed code change.

In some embodiments, transmission of the notification to the end user further comprises a notification of an available range of time in a predetermined window of time in which the proposed code change may be scheduled.

In another aspect, a computer program product for using advanced computation models for data analysis and automated decision-making for code change scheduling conflicts, the computer program product comprising at least one non-transitory computer-readable medium having computer-readable program code portions embodied therein, the computer-readable program code portions including: an executable portion configured to receive a proposed code change associated with an electronic ecosystem from an end user, wherein the proposed code change is comprised of: an identification of at least one element of the electronic ecosystem; and a range of time associated with the proposed code change; an executable portion configured to compile a set of planned code changes within a code change database, wherein a range of time associated with the set of planned code changes overlaps with the range of time associated with the proposed code change; an executable portion configured to compare the proposed code change against the set of planned code changes within the code change database; an executable portion configured to determine a set of affected operations by the proposed code change and the set of planned code changes within the electronic ecosystem using the advanced computation models for data analysis and automated decision-making; an executable portion configured to determine if a code change scheduling conflict exists between the proposed code change and the set of planned code changes within the code change database using the set of affected operations; and an executable portion configured to transmit a notification to the end user upon determination of the code change scheduling conflict indicating the proposed code change conflicts with the set of planned code changes within the code change database.

In another aspect, a method for using advanced computation models for data analysis and automated decision-making for code change scheduling conflicts, the method comprising: receiving a proposed code change associated with an electronic ecosystem from an end user, wherein the proposed code change is comprised of: an identification of at least one element of the electronic ecosystem; and a range of time associated with the proposed code change; compiling a set of planned code changes within a code change database, wherein a range of time associated with the set of planned code changes overlaps with the range of time associated with the proposed code change; comparing the proposed code change against the set of planned code changes within the code change database; determining a set of affected operations by the proposed code change and the set of planned code changes within the electronic ecosystem using the advanced computation models for data analysis and automated decision-making; determining if a code change scheduling conflict exists between the proposed code change and the set of planned code changes within the code change database using the set of affected operations; transmitting a notification to the end user upon determination of the code change scheduling conflict indicating the proposed code change conflicts with the set of planned code changes within the code change database.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Code changes associated with an electronic ecosystem may be scheduled in advance to pause, perform maintenance on, update, or otherwise alter at least one element within said electronic ecosystem. Code changes may be requests, notifications, and/or ranges of time indicating when the element associated with the code change may be operating under reduced capabilities in comparison to routine performance of the element. In other words, when an element within the electronic ecosystem needs to be changed to an extent that it operates in a reduced capacity, a code change is issued indicating said element and the range of time for which it will operate at a reduced capacity.

As code changes are scheduled, the possibility of a plurality of change codes scheduled to occur at overlapping dates and times may cause compounding issues within the electronic ecosystem. Said issues may comprise delays, disruptions, and/or failures within the electronic ecosystem. The size and complexity of the electronic ecosystem further increase the difficulty in determining which elements affect other elements within the electronic ecosystem, or how the reduced operation of said element affects the electronic ecosystem overall. As code changes may be scheduled during times when the elements of the electronic ecosystem are not in use (i.e., late at night or outside of working hours), the possibility of multiple code changes occurring at the same time is further increased, further increasing the need to organize code changes and understand the relationships between the elements they are associated with.

Comparing a proposed code change to other planned code changes using machine learning enables the relationship and interactions between the elements of code changes occurring at the same time to be compared and examined. For example, a first proposed code change may be associated with a first piece of software within the electronic ecosystem. The first proposed code change may have a range of time in which a second code change is scheduled, focused on a second piece of software. The code change associated with the second piece of software may be unavailable during the second code change, and the first and second piece of software may be used to conduct operations within the electronic ecosystems. If both the first and second piece of software are unavailable, operations within the electronic ecosystem may not be performed. A code change scheduling conflict may be determined to exist by the machine learning, as the first and second code changes are scheduled for overlapping times and the elements within the electronic ecosystem towards which the code changes are directed cause the electronic ecosystem to delay, halt, or otherwise affect operations.

Accordingly, the present disclosure comprises using machine learning/advanced computation models for data analysis and automated decision-making to organize scheduled technology changes (code changes) for an electronic ecosystem (e.g., a data center, server, and/or a system with multiple elements/parts). Applications, software, and hardware in a datacenter may be changed, paused, or otherwise altered during similar windows (i.e., a software is down from 11:00 pm Friday until 6:00 am Saturday) and if multiple interconnected applications/systems are down at the same time (i.e., a code change scheduling conflict) the system may be delayed or unresponsive. The artificial intelligence collects data relating to scheduled code changes and determines if a code change scheduling conflict/collision will occur, if the code change scheduling conflict will affect other elements within the electronic ecosystem, and assist in resolving scheduling conflicts between code changes.

What is more, the present disclosure provides a technical solution to a technical problem. As described herein, the technical problem includes scheduling and determining the effects of a proposed code change with respect to an electronic ecosystem and the code changes scheduled. The technical solution presented herein allows for comparison of the code changes through machine learning and the effects of the code changes when they have overlapping times, enabling code change times to be performed at times that reduce the impact on the electronic ecosystem. In particular, comparison and examination of proposed code changes through machine learning is an improvement over existing solutions to the collision of code changes within an electronic ecosystem, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Figure 1A:
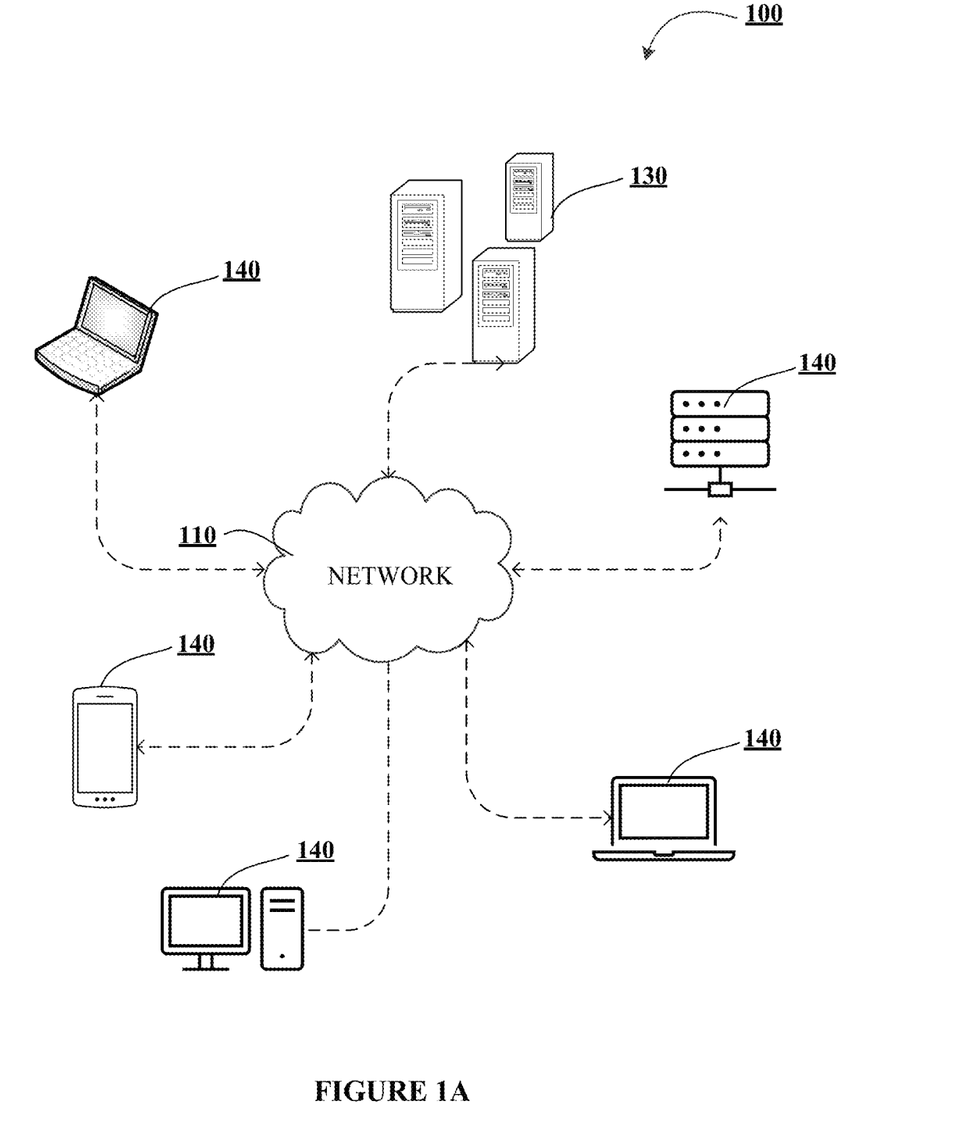
FIGS. 1A-1C illustrates technical components of an exemplary distributed computing environment for advanced computation models for data analysis and automated decision-making for code change scheduling conflicts, in accordance with an embodiment of the disclosure.
Figure 1B:
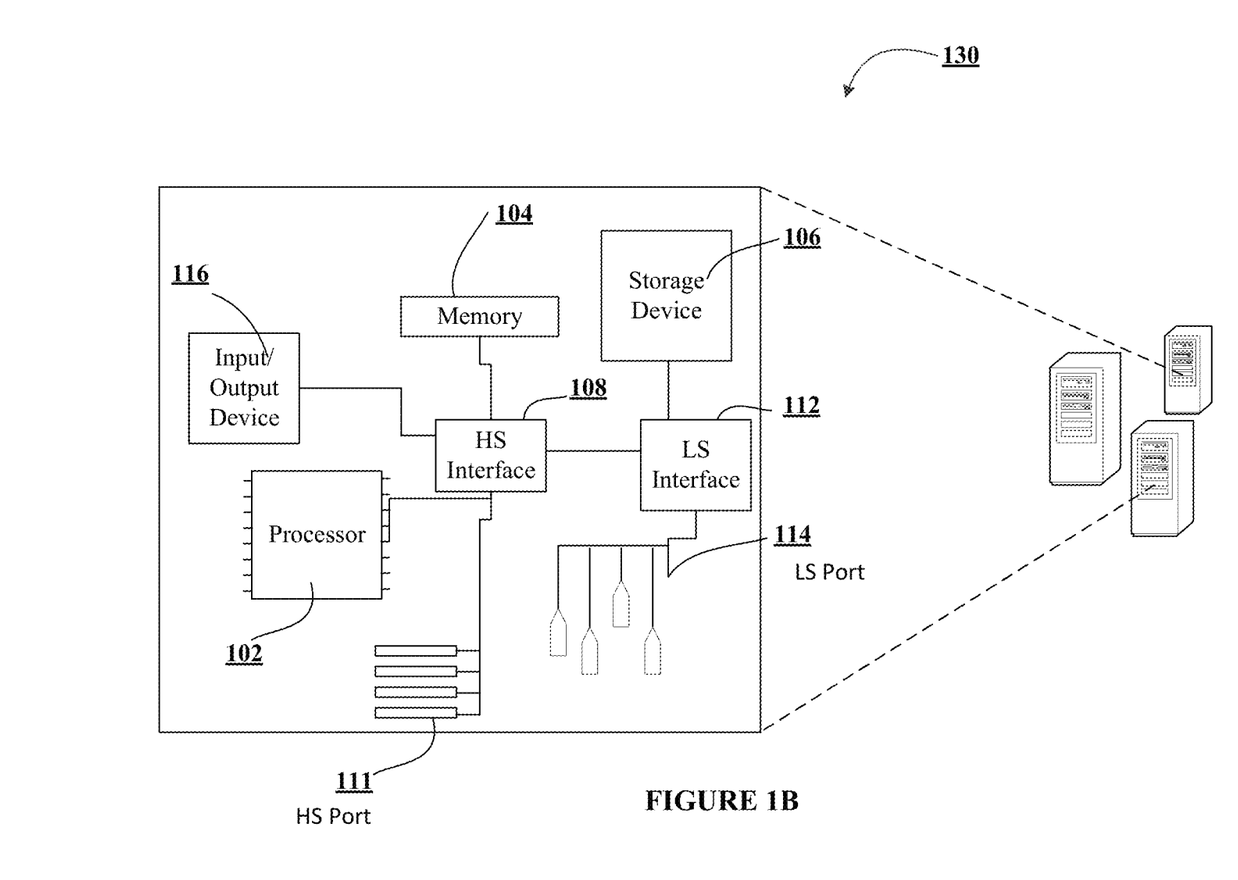
Figure 1C:
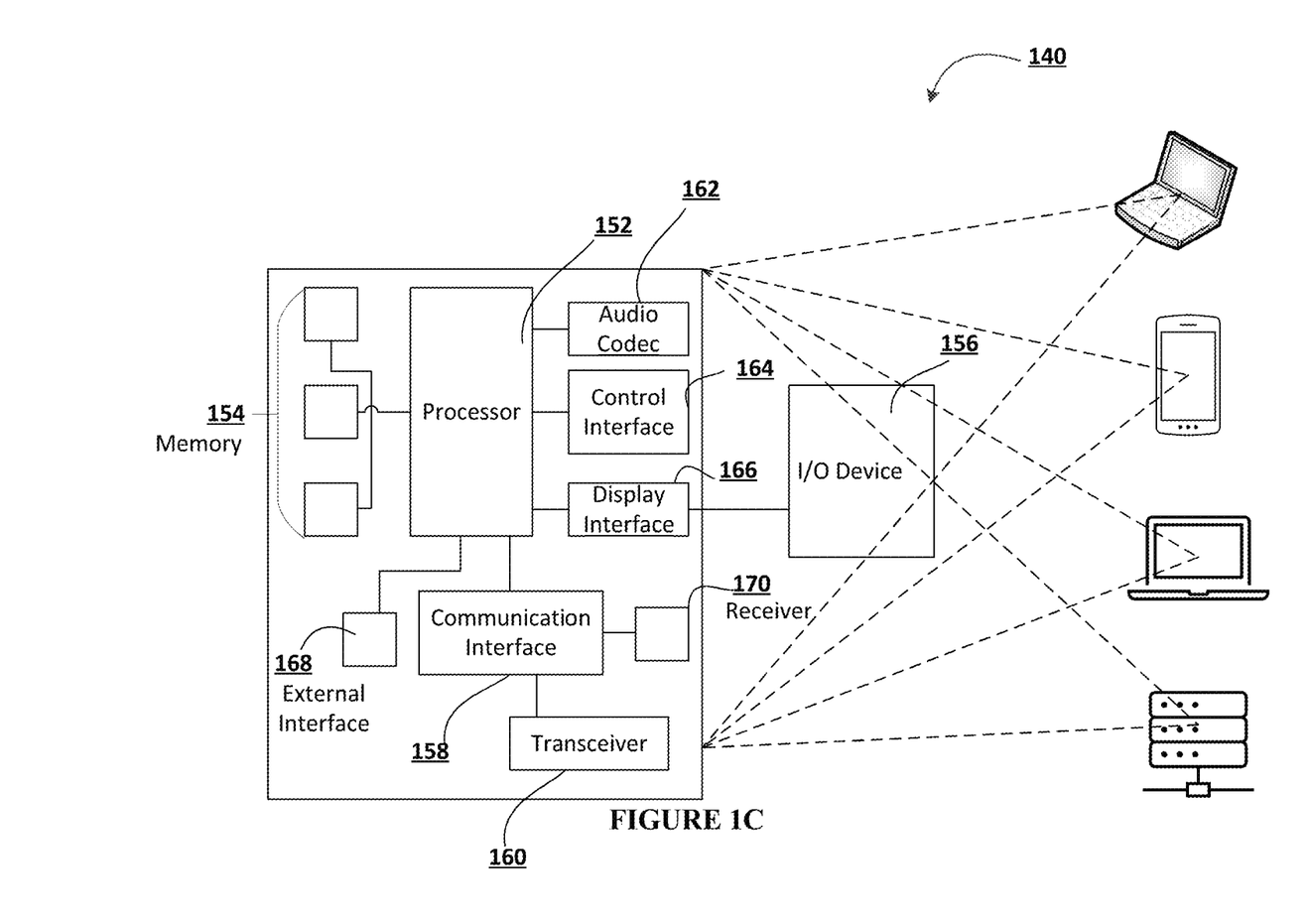

FIGS. 1A-1C illustrate technical components of an exemplary distributed computing environment for advanced computation models for data analysis and automated decision-making for code change scheduling conflicts 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer-or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation-and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
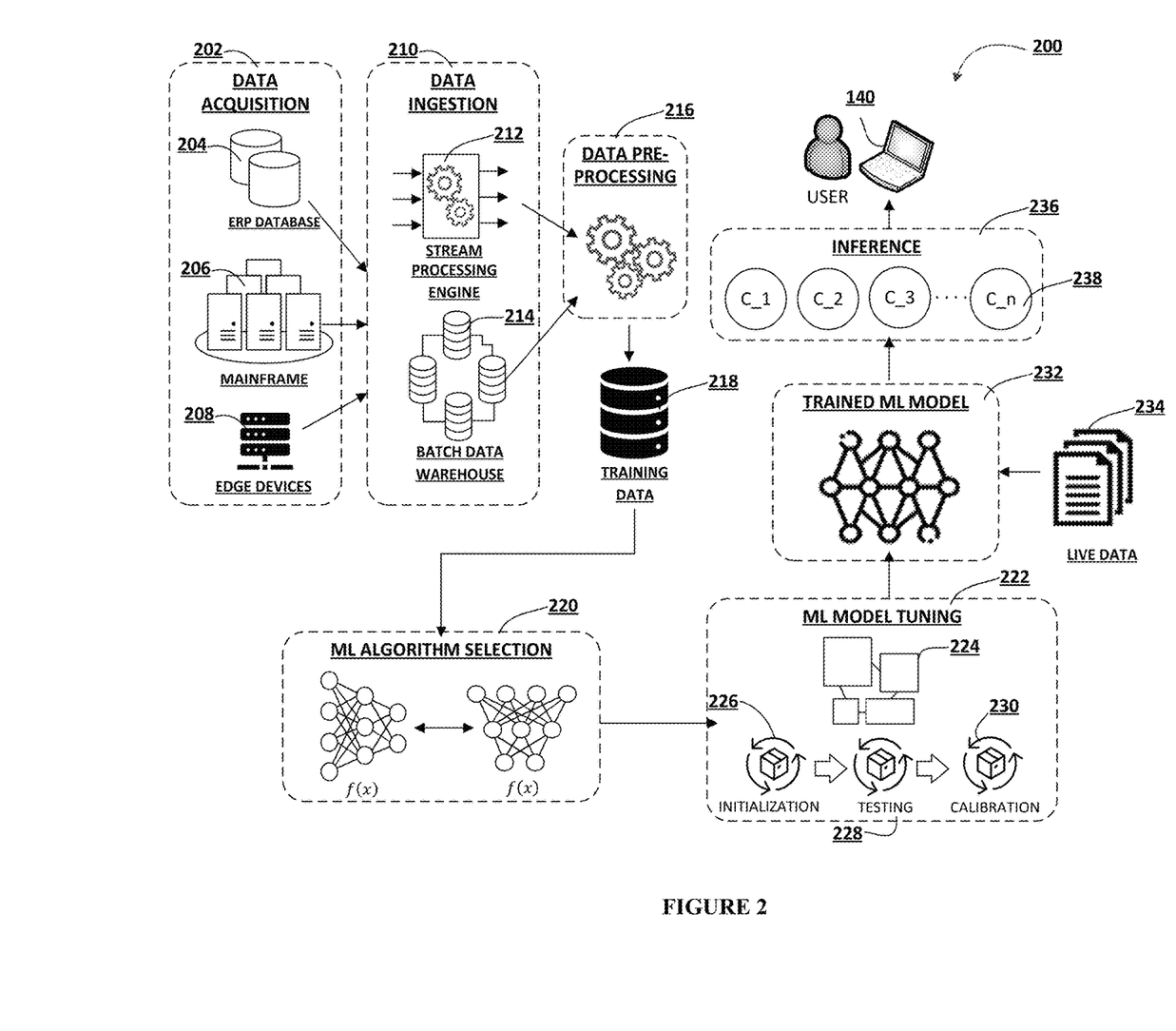
FIG. 2 illustrates an exemplary machine learning (ML) subsystem architecture, in accordance with an embodiment of the disclosure.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

Figure 3:
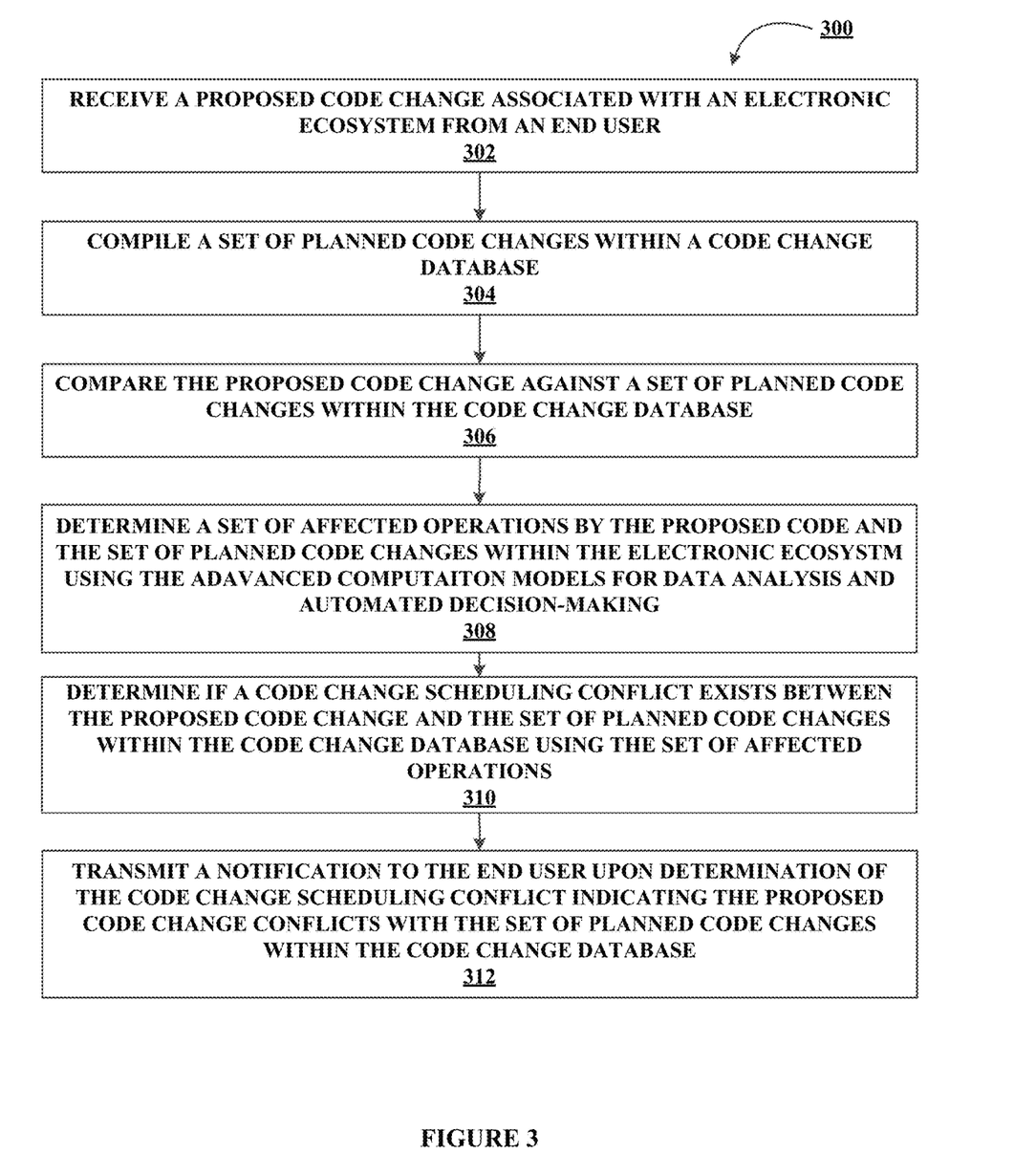
FIG. 3 illustrates a process flow for using advanced computation models for data analysis and automated decision-making for code change scheduling conflicts, in accordance with an embodiment of the disclosure.

FIG. 3 illustrates a process flow 300 for systems and methods of using advanced computation models for data analysis and automated decision-making for code change scheduling conflicts. In some embodiments, a system and method of using advanced computation models for data analysis and automated decision-making for code change scheduling conflicts (e.g., similar to the one or more of the systems described herein with respect to FIGS. 1A-1C, and FIG. 2) may perform one or more of the steps of process flow 300.

As shown in Block 302, the process flow 300 may include the step of receiving a proposed code change associated with an electronic ecosystem from an end user. A code change may be comprised of a range of time associated with the code change (e.g., the date and time in which the code change may be active such as the next Saturday from 10 pm through 11 pm) and an identification of at least one element within the electronic ecosystem (such as a piece of software, hardware, device, system, network, or combination thereof) associated with the proposed code change (e.g., what elements within the electronic ecosystem that may be worked on, updated, or otherwise inactive during the code change). In other words, the code change may be comprised of the time in which an element (such as a software or hardware within the electronic ecosystem) may be undergoing a code change, during which time said identified element may be unavailable, perform with limited capabilities, and/or perform at a rate slower than performance operating level associated with said element before the code change. A code change may be proposed or planned to update, perform maintenance, examine, configure, adjust, and/or otherwise alter the software/hardware associated with the element the code change identifies within the electronic ecosystem.

The electronic ecosystem may be a predetermined set of utilities within an entity comprised of systems, networks, computers, devices, hardware, software, infrastructure, applications, and the like that may be associated and/or interact with the identified element associated with the proposed code change. The electronic ecosystem may further be comprised of access to databases, information, and systems associated with the electronic ecosystem. In other words, the electronic ecosystem may be elements within an entity that interact, connect, correspond, transmit, receive, and/or otherwise work with the element associated with the proposed code change. The end user from which the proposed code change may be received from may be comprised of an entity, individual, team, group and/or user. The proposed code change may additionally be received from an end-point device as described in FIG. 1A-1C.

In some embodiments, the proposed code change may be directed towards the operation, function, and/or management of the associated hardware/software. For instance, a proposed code change may be received from an end user, and the proposed code change may be directed towards a software within an electronic ecosystem. The code change may be comprised of information such as the extent to which the software is functioning in comparison to routine operations and the time in which the software may be functioning differently from routine conditions (i.e., the proposed change code may state that a software may be unavailable from 1 am until 3 am on Saturday night to perform maintenance). The proposed code change may describe the elements, software, and/or hardware which may be involved in the proposed code change (i.e., which parts of the electronic ecosystem may be affected by the proposed code change). The proposed code change may also state the extent of the functionality of the identified element within the code change while the code change is in operation. In other words, the code change may describe and/or provide information into the extent of the capabilities and status of the element identified in the code change during the range of time associated with the proposed code change.

In some embodiments, the proposed code change may be associated with a piece of hardware, software, elements of the electronic ecosystem, or a combination of such. Elements associated with the proposed code change may be altered, updated, worked on, changed, rearranged, replaced, have maintenance performed, and/or otherwise have operations performed on said elements that are unable to be performed while functioning routinely within the electronic ecosystem. The proposed code change may be a transmission, request, and/or notification which may specify the elements of the electronic ecosystem which may be operating at a reduced capacity during the proposed time. The elements and time within the proposed code change may then be compared to planned code changes within the code change database to determine which code changes are occurring at the same time as the proposed code change, and whether the elements associated with the proposed code change affect similar elements within the set of planned code changes within the code change database.

In some embodiments, the proposed code change may further be comprised of a set of modifications proposed to be performed on the at least one element identified within the electronic ecosystem. The set of modifications may describe modifications, adjustments, and/or actions taken as part of the code change during the range of time associated with the code change. For example, the proposed code change may include a planned modification in which a piece of hardware within the electronic ecosystem may be updated, causing the hardware to be down/unresponsive during the proposed code change. The set of modifications may describe the operations, actions, and/or procedures performed on the element associated with the proposed code change. The set of modifications may be accompanied by a range of time associated with the set of modifications made to the identified at least one element within the electronic ecosystem. In other words, the time in which the set of modifications may be performed (for example, from 1 am Saturday until 2 am Saturday a piece of hardware within the electronic ecosystem may be replaced and may be unresponsive during said code change).

As shown in Block 304, the process flow 300 may include the step of compiling a set of planned code changes within a code change database wherein a range of time associated with the set of planned code changes overlaps with the proposed code change. Compiling the set of planned code changes within the code change database may enable planned code changes with matching ranges of time to the proposed code change. In other words, the code changes already scheduled (planned code changes) are compared to the proposed code change. Overlapping ranges of time may include partial overlap. For instance, if the proposed code change has a range of time from Saturday at 1 am through Saturday at 3 am, and a planned code change has a range of time on Saturday from 2 am through Saturday at 4 am, the planned code change is compiled within the set of planned code changes due to the range of times overlapping. The set of planned code changes may be comprised of code changes with a matching and/or overlapping range of time as the planned code change. Compilation of the set of planned code changes within the code change database may enable comparison of the code changes planned to occur during the same time as the proposed code change.

In some embodiments, the overlapping ranges of time may be used to filter the planned code changes that may occur at the same time as the proposed code change. The overlapping ranges of time may enable the proposed code change and the compiled set of planned code changes to be compared, which may be discussed in greater detail below. The indicator of the overlapping range of time may be adjusted, wherein the proposed code change may have overlapping ranges of time with the set of planned code change if the time periods overlap. An overlapping range of time may be configured to mean the range of time associated with the proposed code change and the range of time associated with the planned code change occur within a predetermined window. For instance, an overlapping time may also mean code changes occur within the same hour, day, month, etc. In other words, the overlapping range of time may be adjusted in sensitivity, i.e., how close the planned code changes are to the proposed code change may be adjusted.

As shown in Block 306, the process flow 300 may include the step of comparing the proposed code change against the set of planned code changes within the code change database. Comparison of the proposed code change against the set of planned code changes within the code change database may be performed on scheduled code changes with a similar range of time (i.e., code changes planned/scheduled for the same day and/or time as the proposed code change). For instance, if the proposed code change occurs on Saturday at 1 am through 3 am, and two planned code changes within the code change database occur during that day and time, the proposed code change may be compared against the two code changes occurring at a similar day and time. Comparison of the proposed code change to the planned code changes within the code change database may enable the times and dates associated with the code changes to determine which code changes experience a collision change, or intersecting times. A collision change of code changes may occur upon overlapping days and times for software and hardware within the electronic ecosystem.

In some embodiments, comparison of the proposed code change against the set of planned code changes may be performed through the machine learning subsystem 200 as seen in FIG. 2. The machine learning subsystem, or the advanced computation models for data analysis and automated decision-making may be used to compare the proposed code change against the set of planned code changes through the range of times associated with said code changes and to compare the at least one element identified by said code changes. In other words, the set of code changes occurring at a similar range of time as the proposed code change may be compiled into a list, and the identified elements of at least one element of the electronic ecosystem in the proposed code change may be compared to the elements of electronic ecosystem identified in the set of planned code changes. Comparisons of the elements may enable common elements associated with a code change to be grouped together. For instance, if a proposed code change identifies a piece of hardware in the electronic ecosystem as a planned code change during the same range of time, the planned code change may not cause a scheduling conflict as both focus on the same element. In other words, if an element is already operating at a reduced capacity for a code change, similar code changes to that element may be performed at the same time.

In some embodiments, the machine learning subsystem seen in FIG. 2 may utilize information and data associated with the electronic ecosystem to compare the proposed code change to the set of planned code changes. The information and data associated with the electronic ecosystem may be comprised of configuration item comparisons, application inventory tool comparisons, range of time comparisons, and/or attributes associated with the code change and the subsequent comparisons. The machine learning subsystem may further utilize information technology service management, configuration management databases, and monitoring tools associated with the electronic ecosystem to compare the proposed and planned code changes.

As shown in Block 308, the process flow 300 may include the step of determining a set of affected operations by the proposed code change and the set of planned code changes within the electronic ecosystem using the advanced computation models for data analysis and automated decision-making. The advanced computation models for data analysis and automated decision-making may be embodied at least partially by the machine learning subsystem 200. The machine learning subsystem 200 may be used to analyze the elements associated with the proposed code change and the elements associated with the set of planned code changes to determine if a code change scheduling conflict occurs between the proposed code change and the set of planned code changes. For instance, the elements within the proposed code change may be related or be designated as critical to the operations of the electronic ecosystem such that a first element may not undergo a code change if a second element is undergoing a code change. If an electronic ecosystem uses two pieces of hardware to function for example and is able to function with one piece of hardware (the first piece) if the second piece of hardware is undergoing a code change but the electronic ecosystem is unable to function if the first and second piece of hardware are undergoing a code change, this may create a code change scheduling conflict. The relationship between elements and whether a code change on one element affects another element may be determined using the machine learning subsystem 200.

The machine learning subsystem/advanced computation models for data analysis and automated decision-making may further determine the extent of the code change scheduling conflict, in which the elements associated with the proposed code change are analyzed to determine the degree to which said elements may function. For instance, if a proposed code change is associated with a first piece of hardware that acts as a backup for a second piece of hardware associated with a planned code change, and the planned code change is scheduled to occur at the same time as the proposed code change, the systems and abilities for which the first and second pieces of hardware are associated with may have reduced capabilities, limited functionalities, and/or cause disruptions/outages within the electronic ecosystem. In other words, machine learning (embodied by the machine learning subsystem 200) may be used at least partially to determine if the overlapping code changes cause an element within the electronic ecosystem to experience delays, issues, performance reduction of said elements, and/or disruptions within the electronic ecosystem, creating a code change scheduling conflict.

In some embodiments, the set of affected operations may be elements, abilities, and/or functions of the electronic ecosystem which may be disrupted, delayed, and/or inactive due to the proposed code change and the set of planned code changes occurring during the same range of time. In other words, the set of affected operations may represent the effects of the proposed code change occurring at the same time as the code changes currently scheduled to occur in terms of the electronic environment. For example, a first and second piece of hardware may be used to run an element within the electronic ecosystem. If a first piece of hardware is scheduled to have a planned code change at the same time as the proposed code change for a second piece of hardware, and the element can function with one piece of hardware, then both pieces of hardware undergoing a code change may mean the element is part of the set of affected operations. The element may not be able to function without one of the two pieces of hardware and may therefore be an affected operation. The set of affected operations may then be used to determine the existence of a code change scheduling conflict.

In some embodiments, determination of the existence of the code change scheduling conflict between the proposed code change the set of planned code changes within the code change database further comprises assignment of priority to code changes within the code change database. For instance, the proposed code change may be assigned a higher priority than a planned code change within the planned code change database. The proposed code change may be time sensitive and may be performed before the set of planned code changes within the code change database. Assignment of priority may then enable arrangement of the scheduled code changes within the code change database to reflect the priority assigned. For instance, the set of planned code changes within the code change database occurring at the same time as the proposed code change (between which there is determined to be a scheduling conflict) may be arranged to have the code change with the higher priority to retain the range of time associated with the code change. Assignment of priority for a code change may be used to arrange and order the set of planned code changes within the code change database. The assignment of priority may be used to adjust, organize, and/or arrange the proposed code changes within the code change database and the proposed code change.

In some embodiments, the proposed code change is integrated into the code change database after determination that there is no overlapping range of time between the proposed code change and the set of planned code changes within the code change database. The availability of a range of time in the proposed code change (i.e., when there is no code change scheduling conflict), the proposed code change may be integrated into the code change database to be compared against future proposed code changes. The proposed code change may further be integrated into the code change database and/or be used to train or enhance the machine learning subsystem 200.

As shown in Block 310, the process flow 300 may include the step of determining the existence of a code change scheduling conflict exists between the proposed code change and the set of planned code changes within the code change database using the set of affected operations. A code change scheduling conflict may be comprised of a conflict between the proposed code change and at least one of the scheduled code changes within the set of scheduled code changes. The scheduling conflict may be determined to exist if the proposed code change and the at least one of the planned code changes within the set of scheduled code changes occur at overlapping ranges of time (i.e., occur during the same time frame or length of time), and are associated with elements within the electronic ecosystem scheduled to undergo a code change during the same range of time. A scheduling conflict may further be determined to exist if the proposed code change and the at least one of the planned code changes are determined to interrupt, disrupt, or otherwise alter the electronic ecosystem to beyond a predetermined threshold. For example, if the planned code change and the scheduled code change are scheduled for the same time and the performance of both code changes occurring simultaneously causes operation of the electronic ecosystem to perform below a predetermined standard, then a code change scheduling conflict may be determined to exist.

As shown in Block 312, the process flow 300 may include the step of transmitting a notification to the end user upon determination of the code change scheduling conflict indicating the proposed code change conflict with the set of planned code changes within the code change database. The transmitted notification may be comprised of a notification indicating the code change scheduling conflict, the range of time in which the proposed code change and the scheduled code change may overlap, the affected operations associated with the overlapping code changes, and/or the associated elements within the electronic ecosystem which may be affected by the overlapping code changes. The notification may be transmitted to the end user upon discovery of the code change scheduling conflict. In some embodiments, the notification may be transmitted to an end-point device as described in FIGS. 1A-1C.

In some embodiments, transmission of the notification to the end user further comprises a notification of an available range of time in a predetermined window of time in which the proposed code change may be scheduled. If a change scheduling conflict is found between the proposed code change and the set of planned code changes, a predetermined length of time may be searched around the range of time associated with the proposed code change. For instance, if a change scheduling conflict is found between a proposed code change and the set of planned code changes on a Saturday night at 11:00 pm, and the code change may occur within 8 hours of the originally proposed range of time, available times within the 8-hour window may be transmitted to the end user. In other words, if the proposed schedule change occurs within a predetermined window of time and the range of time is found to be open within said predetermined window, the available time may be transmitted to the end user within the notification.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for advanced computation models for data analysis and automated decision-making for code change scheduling conflicts, the system comprising:
   at least one non-transitory storage device; and
   at least one processing device coupled to the at least one non-transitory storage device, wherein the at least one processing device is configured to:
      receive a proposed code change associated with an electronic ecosystem from an end user,
      wherein the proposed code change is comprised of:
         an identification of at least one element of the electronic ecosystem; and
         a range of time associated with the proposed code change;
      compile a set of planned code changes within a code change database,
      wherein a range of time associated with the set of planned code changes overlaps with the range of time associated with the proposed code change;

compare the proposed code change against the set of planned code changes within the code change database using the advanced computation models for data analysis and automated decision-making trained on configuration management database records, application inventory data, and monitoring tool outputs associated with the electronic ecosystem;

determine a set of affected operations by the proposed code change and the set of planned code changes within the electronic ecosystem using the advanced computation models for data analysis and automated decision-making based on relational dependencies between software, hardware, and network elements automatically identified by the advanced computational models for data analysis and automated decision-making. wherein the determination comprises calculating disruptions, outages, and reduced performance of the electronic ecosystem;

determine if a code change scheduling conflict exists between the proposed code change and the set of planned code changes within the code change database using the set of affected operations; and transmit a notification to the end user upon determination of the code change scheduling conflict indicating the proposed code change conflicts with the set of planned code changes within the code change database.

2. The system of claim 1, wherein the proposed code change is integrated into the code change database when there is no overlapping range of time between the proposed code change and the set of planned code changes within the code change database.

3. The system of claim 1, wherein the set of affected operations comprises elements within the electronic ecosystem altered from the implementation of the proposed code change and the set of planned code changes.

4. The system of claim 1, wherein the proposed code change is further comprised of a set of modifications proposed to be performed on the at least one element identified within the electronic ecosystem.

5. The system of claim 1, wherein determination of the existence of the code change scheduling conflict between the proposed code change and the set of planned code changes within the code change data base further comprises:
assignment of priority to the set of planned code changes within the code change database;
arrangement of the set of planned code changes within the code change database based on the assigned priority; and
adjustment of the set of planned code changes within the code change database.

6. The system of claim 1, wherein transmission of the notification to the end user comprises a notification of the set of affected operations and the set of collision changes within the electronic ecosystem by the proposed code change.

7. The system of claim 6, wherein transmission of the notification to the end user further comprises a notification of an available range of time in a predetermined window of time in which the proposed code change may be scheduled.

8. A computer program product for advanced computation models for data analysis and automated decision-making for code change scheduling conflicts, the computer program product comprising at least one non-transitory computer-readable medium having computer-readable program code portions embodied therein, the computer-readable program code portions comprising:

an executable portion configured to receive a proposed code change associated with an electronic ecosystem from an end user,
wherein the proposed code change is comprised of:
an identification of at least one element of the electronic ecosystem; and
a range of time associated with the proposed code change;
an executable portion configured to compile a set of planned code changes within a code change database,
wherein a range of time associated with the set of planned code changes overlaps with the range of time associated with the proposed code change;
an executable portion configured to compare the proposed code change against the set of planned code changes within the code change database using the advanced computation models for data analysis and automated decision-making trained on configuration management database records, application inventory data, and monitoring tool outputs associated with the electronic ecosystem;
an executable portion configured to determine a set of affected operations by the proposed code change and the set of planned code changes within the electronic ecosystem using the advanced computation models for data analysis and automated decision-making based on relational dependencies between software, hardware, and network elements automatically identified by the advanced computational models for data analysis and automated decision-making, wherein the determination comprises calculating disruptions, outages, and reduced performance of the electronic ecosystem;
an executable portion configured to determine if a code change scheduling conflict exists between the proposed code change and the set of planned code changes within the code change database using the set of affected operations; and
an executable portion configured to transmit a notification to the end user upon determination of the code change scheduling conflict indicating the proposed code change conflicts with the set of planned code changes within the code change database.

9. The computer program product of claim 8, wherein the proposed code change is integrated into the code change database when there is no overlapping range of time between the proposed code change and the set of planned code changes within the code change database.

10. The computer program product of claim 8, wherein the set of affected operations comprises elements within the electronic ecosystem altered from the implementation of the proposed code change and the set of planned code changes.

11. The computer program product of claim 8, wherein the proposed code change is further comprised of a set of modifications proposed to be performed on the at least one element identified within the electronic ecosystem.

12. The computer program product of claim 8, wherein determination of the existence of the code change scheduling conflict between the proposed code change and the set of planned code changes within the code change data base further comprises:
assignment of priority to the set of planned code changes within the code change database;
arrangement of the set of planned code changes within the code change database based on the assigned priority; and
adjustment of the set of planned code changes within the code change database.

13. The computer program product of claim 8, wherein transmission of the notification to the end user comprises a notification of the set of affected operations and the set of collision changes within the electronic ecosystem by the proposed code change.

14. The computer program product of claim 13, wherein transmission of the notification to the end user further comprises a notification of an available range of time in a predetermined window of time in which the proposed code change may be scheduled.

15. A method for advanced computation models for data analysis and automated decision-making for code change scheduling conflicts, the method comprising:
   receiving a proposed code change associated with an electronic ecosystem from an end user,
   wherein the proposed code change is comprised of:
      an identification of at least one element of the electronic ecosystem; and
      a range of time associated with the proposed code change;
   compiling a set of planned code changes within a code change database,
   wherein a range of time associated with the set of planned code changes overlaps with the range of time associated with the proposed code change;
   comparing the proposed code change against the set of planned code changes within the code change database using the advanced computation models for data analysis and automated decision-making trained on configuration management database records, application inventory data, and monitoring tool outputs associated with the electronic ecosystem;
   determining a set of affected operations by the proposed code change and the set of planned code changes within the electronic ecosystem using the advanced computation models for data analysis and automated decision-making based on relational dependencies between software, hardware, and network elements automatically identified by the advanced computational models for data analysis and automated decision-making, wherein the determination comprises calculating disruptions, outages, and reduced performance of the electronic ecosystem;
   determining if a code change scheduling conflict exists between the proposed code change and the set of planned code changes within the code change database using the set of affected operations; and
   transmitting a notification to the end user upon determination of the code change scheduling conflict indicating the proposed code change conflicts with the set of planned code changes within the code change database.

16. The method of claim 15, wherein the method further comprises integrating the proposed code change into the code change database when there is no overlapping range of time between the proposed code change and the set of planned code changes within the code change database.

17. The method of claim 15, wherein the set of affected operations comprises elements within the electronic ecosystem altered from the implementation of the proposed code change and the set of planned code changes.

18. The method of claim 15, wherein determining the existence of the code change scheduling conflict between the proposed code change and the set of planned code changes within the code change data base further comprises:
   assignment of priority to the set of planned code changes within the code change database;
   arrangement of the set of planned code changes within the code change database based on the assigned priority; and
   adjustment of the set of planned code changes within the code change database.

19. The method of claim 15, wherein transmitting the notification to the end user comprises a notification of the set of affected operations and the set of collision changes within the electronic ecosystem by the proposed code change.

20. The method of claim 19, wherein transmitting the notification to the end user further comprises a notification of an available range of time in a predetermined window of time in which the proposed code change may be scheduled.

* * * * *